(12) United States Patent
Xiong et al.

(10) Patent No.: US 11,533,759 B2
(45) Date of Patent: Dec. 20, 2022

(54) RANDOM ACCESS METHOD, TERMINAL EQUIPMENT AND COMPUTER STORAGE MEDIUM

(71) Applicant: Samsung Electronics Co., Ltd., Suwon-si (KR)

(72) Inventors: Qi Xiong, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 16/672,360

(22) Filed: Nov. 1, 2019

(65) Prior Publication Data
US 2020/0146070 A1   May 7, 2020

(30) Foreign Application Priority Data
Nov. 1, 2018 (CN) .......................... 201811296434.5

(51) Int. Cl.
*H04W 74/08*   (2009.01)
*H04L 5/00*    (2006.01)
(Continued)

(52) U.S. Cl.
CPC ....... *H04W 74/0833* (2013.01); *H04L 1/0061* (2013.01); *H04L 5/0048* (2013.01);
(Continued)

(58) Field of Classification Search
None
See application file for complete search history.

(56) References Cited

U.S. PATENT DOCUMENTS

| 2018/0220450 A1 | 8/2018 | Aiba et al. |
| 2018/0279136 A1 | 9/2018 | Tsai et al. |

(Continued)

FOREIGN PATENT DOCUMENTS

| EP | 3753357 A1 | 12/2020 |
| WO | 2018/144586 A1 | 8/2018 |
| WO | 2019/160316 A1 | 8/2019 |

OTHER PUBLICATIONS

Lenovo et al., "Discussion of multiple PRACH transmissions", 3GPP TSG RAN WG1 Meeting #88, Feb. 13-18, 2017, R1-1702663, 3 pages.

(Continued)

*Primary Examiner* — Alex Skripnikov

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application relates to the field of radio communication technology, and discloses a random access method, a terminal equipment, and a computer readable storage medium, wherein the random access method includes: receiving configuration information for random access from a base station; determining available first physical random access channel transmission occasions (ROs) according to at least one configured CSI-RS based on the configuration information; and performing random access according to the available first ROs. The method of the embodiment of the present application enables the UE to determine the time-frequency resources for random access by the configured CSI-RS indication.

8 Claims, 9 Drawing Sheets

(51) Int. Cl.
  *H04W 56/00* (2009.01)
  *H04L 1/00* (2006.01)
  *H04W 76/27* (2018.01)
  *H04W 72/04* (2009.01)

(52) U.S. Cl.
  CPC ......... *H04W 56/001* (2013.01); *H04W 76/27* (2018.02); *H04W 72/044* (2013.01)

(56) References Cited

U.S. PATENT DOCUMENTS

2019/0254071 A1* 8/2019 Park .................. H04L 5/0053
2020/0323009 A1* 10/2020 Jiang ................. H04W 76/18

OTHER PUBLICATIONS

Samsung, "Remaining Issues on Random Access", 3GPP TSG RAN WG1 Meeting #94, Aug. 20-24, 2018, R1-1808746, 5 pages.
ZTE, "4-step random access procedure", 3GPP TSG RAN WG1 Meeting #90, Aug. 21-25, 2017, R1-1712067, 16 pages.
International Search Report dated Feb. 7, 2020 in connection with International Patent Application No. PCT/KR2019/014736, 3 pages.
European Patent Office, "Supplementary European Search Report," dated Jul. 4, 2022, in connection with European Patent Application No. 19877646.0, 10 pages.
Huawei et al., "Remaining issues on physical random access channel and procedure" R1-1810097, 3GPP TSG RAN WG1 Meeting #94bis, Chengdu, China, Oct. 8-12, 2018, 8 pages.

* cited by examiner

RANDOM ACCESS METHOD, TERMINAL EQUIPMENT AND COMPUTER STORAGE MEDIUM

CROSS-REFERENCE TO RELATED APPLICATION

This application is based on and claims priority under 35 U.S.C. 119 to Chinese Patent Application No. 201811296434.5 filed on Nov. 1, 2018 in China National Intellectual Property Administration, the disclosure of which is herein incorporated by reference in its entirety.

BACKGROUND

1. Field

The present application relates to the field of radio communication technology, and in particular, to a random access method, a terminal equipment, and a computer storage medium.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Transmission in a radio communication system includes: transmission from a base station (gNB) to a user equipment (UE) (referred to as downlink transmission) and the corresponding slot is referred to as a downlink slot, and a transmission from the UE to the base station (referred to as uplink transmission) and the corresponding slot is referred as an uplink slot.

In the downlink communication of a radio communication system, the system periodically transmits a synchronization signal and a broadcast channel to the user through a synchronization signal block (SSB, synchronization signal/PBCH block), wherein the period is an SSB periodicity, or referred to as the SSB burst periodicity. Meanwhile, the base station will configure a physical random access channel configuration period (PRACH configuration period), and configures a certain number of random access transmission occasions (also referred as PRACH transmission occasion, RO) in this period and satisfies that all the SSBs in an association period (i.e., a certain of time) can be mapped to the corresponding RO.

In a new radio (NR) communication system, the performance of random access directly affects the user's experience before the establishment of radio resource control, for example, in a random access procedure. In a conventional radio communication system, such as LTE and LTE-Advanced, a random access is applied to multiple scenarios such as establishing an initial link, a cell handover, re-establishing an uplink, and radio resource control (RRC) connection reconstruction. In addition, the random access is divided into contention-based random access and contention-free random access according to whether the user monopolizes the preamble sequence resources. In the contention-based random access, in the procedure of attempting to establish an uplink link, each user selects a preamble sequence from a same preamble sequence resources, and multiple users may select the same preamble sequence to transmit to the base station, so the conflict resolution mechanism is an important research direction in random access. How to reduce the conflict probability and how to quickly resolve conflicts that have already occurred is a key indicator affecting the performance of random access.

The contention-based random access procedure in LTE-A is divided into four steps, as shown in FIG. 1. In step 1, a user randomly selects one preamble sequence from a preamble sequence resource pool and transmits it to a base station. The base station performs correlation detection on the received signal to identify the preamble sequence transmitted by the user. In step 2, the base station transmits a random access response (RAR) to the user, which includes a random access preamble sequence identifier, a timing advance command determined according to a time delay estimation between the user and the base station, a cell-radio network temporary identifier (C-RNTI), and time-frequency resources allocated for the next uplink transmission of the user. In step 3, the user transmits a third message (Msg3) to the base station according to the information in the RAR. The Msg3 includes information such as a user terminal identifier and an RRC link request, wherein the user terminal identifier is unique to the user and is used for conflict resolution. In step 4, the base station transmits a conflict resolution identifier to the user which includes the identifier of the user terminal that has won the conflict resolution. After detecting the identity of the user, the user upgrades the temporary C-RNTI to the C-RNTI, and transmits an ACK signal to the base station to complete the random access and wait for the scheduling of the base station. Otherwise, the user will start a new random access after a delay.

For a contention-free based random access procedure, a preamble sequence may be allocated to the user since the base station knows the user identifier. Therefore, when transmitting the preamble sequence, the user does not need to randomly select the sequence, but uses the allocated preamble sequence. After detecting the allocated preamble sequence, the base station transmits a corresponding RAR, which includes information such as timing advance and uplink resource allocation. After receiving the RAR, the user considers that the uplink synchronization has been completed and waits for further scheduling of the base station. Therefore, the contention-free based random access only includes two steps: step 1 is to transmit a preamble sequence; and step 2 is to transmit an RAR.

The random access in LTE is applicable to the following scenarios:

1. initial access under RRC IDLE;
2. re-establish the RRC connection;
3. cell handover;
4. in the RRC connected state, downlink data arrives and requests a random access (when the uplink is in non-synchronization);
5. in the RRC connected state, the uplink data arrives and requests a random access (when the uplink is in non-synchronization or resources are not allocated to the scheduling request from the PUCCH resources);
6. location.

However, in a 5G NR system, there are random access resources based on association of the channel state information-reference signal (CSI-RS) and the RO, in addition to the random access resources based on the association of the SSB and the RO. Therefore, how to enable a UE to determine the time-frequency resources (i.e., RO) for random access through a CSI-RS based indication manner is a problem to be solved.

SUMMARY

The purpose of the present application is to solve at least one of the above technical defects, and the following technical solutions are proposed:

In a first aspect, a random access method is provided, including:

receiving configuration information for random access from a base station;

determining available first ROs according to at least one configured channel state information-reference signal (CSI-RS) based on the configuration information;

performing random access according to the available first ROs.

In a second aspect, a random access method is provided, including:

receiving configuration information for random access from a base station;

determining available second ROs according to at least one configured SSB based on the configuration information; and performing random access according to the available second ROs.

In a third aspect, a terminal equipment is provided, including:

a first receiving module configured to receive configuration information for random access from a base station;

a first determination module configured to determine available first ROs, according to at least one configured channel state information reference signal (CSI-RS), based on the configuration information;

a first access module configured to perform random access according to the available first ROs.

In a fourth aspect a terminal equipment is provided, including:

a second receiving module configured to receive configuration information for random access from a base station;

a second determination module configured to determine available second ROs, according to at least one configured SSB, based on the configured information; and a second access module configured to perform random access according to the available second ROs.

In a fifth aspect, a terminal equipment is provided, including a memory, a processor, and a computer program stored on the memory and operable on the processor, wherein the random access method is implemented when the processor executes the program.

In a sixth aspect, a computer readable storage medium is provided, the computer readable storage medium stores a computer program, that, when executed by a processor, implements the random access method described above.

The random access method provided by the embodiment of the present application receives the configuration information for random access from the base station, and provides the premise guarantee for the subsequent random access; and determines the available first ROs according to the at least one configured CSI-RS based on the configuration information, so that the UE can determine the time-frequency resources for random access through the indication of the configured CSI-RS, providing more ways of performing random access while laying the basis for subsequent random access; the random access is performed according to the available first ROs, so that random access is quickly performed according to the ROs determined by the CSI-RS.

The random access method provided by the embodiment of the present application receives the configuration information for random access from the base station, and provides the premise guarantee for the subsequent determination of the ROs; and determines the available the second ROs according to the configured at least one SSB based on the configuration information so that the UE can determine the time-frequency resources for random access through the indication of the configured SSB, providing more ways of performing random access while laying the basis for subsequent random access; the random access is performed according to the available first ROs, so that random access is quickly performed according to the ROs determined by the SSB, and the UE can perform autonomous handover in the presence of long-range interference, thereby increasing the probability of successful random access.

The aspects and advantages of the present invention will be set forth in part in the following description, or learned through the practice of the present application.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
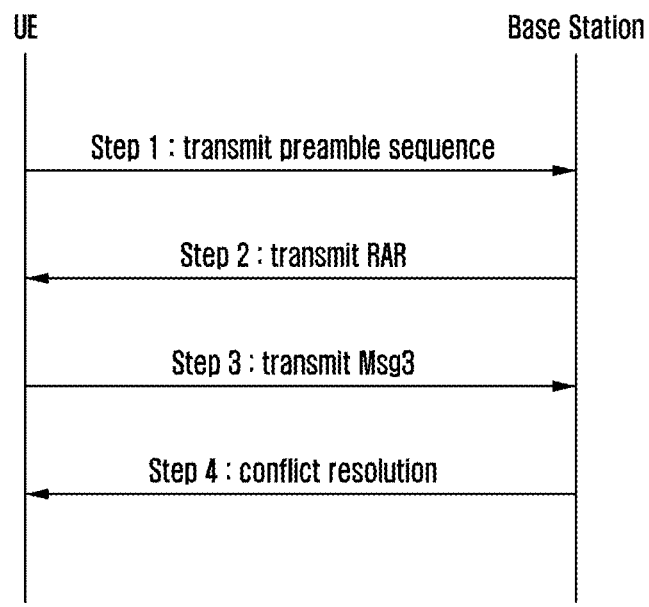
FIG. 1 illustrates a schematic diagram of a random access procedure in the prior art.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, the term "and/or" includes all or any one of one or more associated listed items or combinations thereof.

In order to make the objects, technical solutions and advantages of the present application clearer, the embodiments of the present application will be further described in detail below with reference to the accompanying drawings.

Further, in some communication systems, such as a communication system in which remote interference management (RIM) is considered, when a cell base station receives a random access signal in its own cell, it may be interfered by other base stations from other cells. As a result, the success rate of reception is very low, and a lot of accesses of the user fail. Therefore, how to improve the random access success rate of the user in the case of long-range interference is a problem to be solved.

The random access method, terminal equipment and computer readable storage medium provided by the present application are intended to solve the above technical problem of the prior art.

The technical solutions of the present application and how to solve the above technical problem are described in detail in the following specific embodiments. The following specific embodiments may be combined with each other, and the same or similar concepts or processes may not be described in some embodiments. Embodiments of the present application will be described below with reference to the accompanying drawings.

Wherein, a time domain unit (also referred to as a time unit) in the present application may be: one OFDM symbol, one OFDM symbol group (consisting of multiple OFDM symbols), one slot, one slot group (consisting of multiple slots), one subframe, one subframe group (consisting of multiple subframes), one system frame, one system frame group (consisting of multiple system frames); it may be an absolute time unit, such as 1 millisecond, 1 second, etc.; the time unit could be a combination of multiple granularities, such as N1 slots plus N2 OFDM symbols.

In addition, the frequency domain unit in the present application may be: one subcarrier, one subcarrier group (consisting of multiple subcarriers), one resource block (RB) (it could be referred to as one physical resource block (PRB)), one resource block group (consisting of multiple RBs), one bandwidth part (BWP), one bandwidth part group (consisting of multiple BWPs), one bandwidth/carrier, and one bandwidth group/carrier group; it could be an absolute frequency domain unit, such as 1 Hz, 1 kHz, etc.; the frequency domain unit could be a combination of multiple granularities, such as M1 PRBs plus M2 subcarriers.

Figure 2:
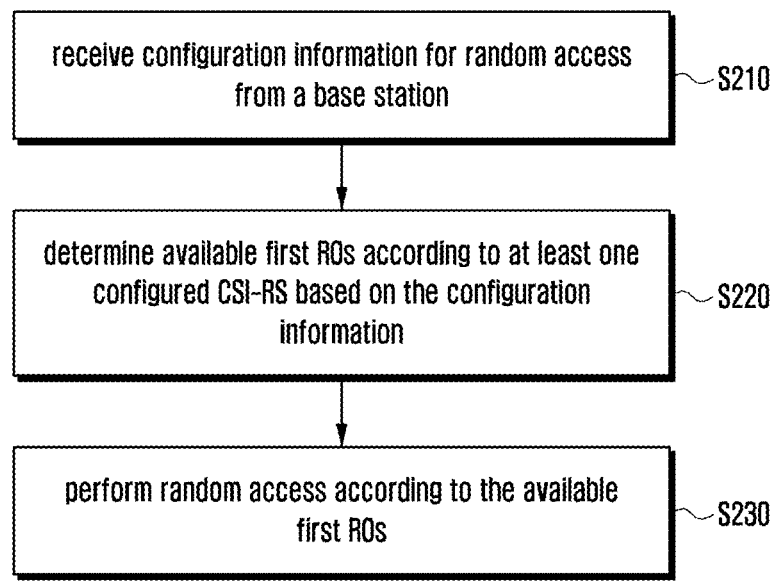
FIG. 2 illustrates a schematic flowchart of a random access method according to an embodiment of the present application.

An embodiment of the present application provides a random access method, as shown in FIG. 2, including: Step S210: receiving configuration information for random access from a base station; Step S220: determining available first ROs according to at least one configured CSI-RS based on the configuration information; and Step S230: performing random access according to the available first ROs.

Compared with the prior art, the random access method provided by the embodiment of the present application receives the configuration information for random access from the base station, and provides the premise guarantee for the subsequent random access; the available first ROs according to the at least one configured CSI-RS based on the configuration information are determined, so that the UE can determine the time-frequency resources for random access through the indication of the configured CSI-RS, providing more ways of performing random access while laying the basis for subsequent random access; the random access is performed according to the available first ROs, so that random access is quickly performed according to the ROs determined by the CSI-RS.

Specifically, the determining the available first ROs according to at least one configured CSI-RS based on the configured information, includes:

determining a indexing time period of the ROs based on the configuration information;

determining the available first ROs according to the at least one configured CSI-RS based on the indexing time period.

Further, the determining the available first ROs according to the at least one configured CSI-RS based on the indexing time period, includes:

determining a target CSI-RS for determining the ROs according to the at least one configured CSI-RS;

determining the available first ROs associated to the target CSI-RS according to the indexing time period and the index of the at least one ROs mapped by the target CSI-RS.

Further, the determining the target CSI-RS for determining the ROs according to the at least one configured CSI-RS, including any one of the following situations:

If there is one configured CSI-RS, the configured CSI-RS is determined as the target CSI-RS;

if there are multiple configured CSI-RSs, any CSI-RS selected randomly from the multiple CSI-RSs with a medium probability is determined as the target CSI-RS;

determining the CSI-RS having the highest reference signal received power among the multiple CSI-RSs as the target CSI-RS.

Further, the determining the available first ROs associated to the target CSI-RS based on the indexing time period and an index of the at least one RO mapped by the target CSI-RS, including:

indexing at least one RO in each indexing time period according to a predetermined manner respectively to obtain a time-frequency resource location associated to each RO, wherein the RO is characterized by an index, and the initial index of the RO in each indexing time period is reset;

determining the time-frequency resource location of the available first ROs associated to the target CSI-RS based on an index of at least one RO mapped by the target CSI-RS or based on a predefined association relationship between the CSI-RS and the RO and an index of at least one RO mapped by the target CSI-RS.

Further, the determining a indexing time period of the RO based on the configuration information, including any one of the following:

determining first association information from synchronization signal block (SSB) to ROs and second association information from the CSI-RS to the ROs, the first association information comprises an association period from SSB to ROs and/or an association pattern period from the SSB to the ROs, the second association information includes an association period from CSI-RS to ROs and/or an association pattern period from the CSI-RS to the ROs;

obtaining a PRACH configuration period from the configuration information;

computing a time duration in which each CSI-RS configured in one CSI-RS period is completely mapped to a corresponding RO, according to the configuration information;

computing a time duration in which each SSB configured in one SSB period is completely mapped to a corresponding RO, according to the configuration information.

Further, the indexing time period includes any one of the following:

an association period from the CSI-RS to the RO;
an association pattern period from the CSI-RS to the RO;
an association period from the SSB to the RO;
an association pattern period from the SSB to the RO;
a PRACH configuration period;
a time duration in which each CSI-RS configured in one CSI-RS period is completely mapped to a corresponding RO; and
a time duration in which each SSB configured in one SSB period is completely mapped to a corresponding RO.

Further, the indexing at least one RO in each indexing time period according to a predetermined manner, respectively, to obtain the time frequency resource location associated to each RO, including any one of the following cases:

indexing indexes of all the ROs in each indexing time period according to the predetermined manner;

for any indexing time period, selecting valid ROs from ROs in the indexing time period based on a predetermined selection rule, and indexing indexes of the valid ROs according to the predetermined manner;

for any indexing time period, selecting valid ROs from ROs in the indexing time period based on a predetermined selection rule, and selecting ROs to be indexed from the valid ROs, and indexing indexes of the ROs to be indexed according to the predetermined manner.

Further, the selecting ROs to be indexed from the valid ROs, including:

selecting ROs to be indexed from the valid ROs according to the minimum number of valid ROs in each indexing time period and the time-frequency resource locations of the minimum number of valid ROs in the corresponding indexing time period.

Further, the performing random access according to the valid ROs, includes:

if there is one time-frequency resource location of available first ROs, then performing random access according to the first ROs; or if there are multiple time-frequency resource locations of available first ROs, then performing one or more of the following operations:

determining an index with the lowest index value in the available first ROs associated to multiple time-frequency resource locations, and performing random access according to the ROs with the lowest index value;

randomly selecting any first ROs from the valid first ROs associated to multiple time-frequency resource locations with a medium probability, and performing random access according to any first ROs;

determining the first available first ROs in the available first ROs associated to multiple time-frequency resource locations, and performing random access according to the first available first ROs, wherein the first available first ROs are the first available first ROs after a UE completes a preparation of transmission of random access preambles.

Further, specifically, the configuration information includes one or more of random access configuration information, SSB configuration information or CSI-RS configuration information.

The random access configuration information includes one or more of the following:
PRACH configuration period; frequency-domain unit index of ROs; time-frequency unit index of ROs; number of ROs; format of random access preamble; number of random access preambles; root sequence index of random access preamble; cyclic shift value of random access preamble; number of SSBs that can be mapped on one RO; index of at least one CSI-RS for random access; number of ROs mapped by one CSI-RS; or index of at least one RO mapped by one CSI-RS.

The SSB configuration information includes one or more of the following:
size of SSB period; number of SSBs transmitted in one SSB period; indexes of SSBs transmitted in one SSB period; time unit locations of SSBs transmitted in one SSB period; or frequency-domain unit locations of SSBs transmitted in one SSB period.

The CSI-RS configuration information includes at one or more of the following:
size of CSI-RS period; number of CSI-RSs transmitted in one CSI-RS period; indexes of CSI-RSs transmitted in one CSI-RS period; time unit locations of CSI-RSs transmitted in one CSI-RS period; or frequency-domain unit locations of CSI-RSs transmitted in one CSI-RS period.

In the following, the random access method of the foregoing embodiment of the present application is described in a comprehensive and detailed manner:

In a communication system of 5G-NR, in addition to the SRB-based RO, there is also a CSI-RS-based RO configuration, therefore the UE needs to obtain a method based on an association from CSI-RS to RO to obtain an available RO method to implement the random access.

Specifically, in this embodiment, the UE obtains configuration information of the network from the network side through system information or RRC configuration message or the downlink control channel, including one or more of the following:

random access configuration information, including one or more of the following:
PRACH configuration period;
time unit index of RO (such as slot index, symbol index, subframe index, etc.);
frequency domain unit index of RO (such as carrier index, BWP index, PRB index, subcarrier index, etc.);
number of ROs;
format of random access preamble (such as cyclic prefix (CP) length, preamble sequence length and repetition number, guard interval (GT) length, used subcarrier size, etc.);
number of random access preambles, the index of the root sequence, and the cyclic shift value;
number of SSBs that can be mapped on one RO;
one or more CSI-RS indexes for random access;
number of ROs mapped by one CSI-RS;
one or more RO indexes mapped by one CSI-RS;
SSB configuration information, including one or more of the following:
size of SSB period;
number of SSBs transmitted in one SSB period;
indexes of the SSBs transmitted in one SSB period;
time unit locations of the SSBs transmitted in one SSB period;
frequency domain unit locations of the SSBs transmitted in one SSB period;
CSI-RS configuration information, including one or more of the following:
size of CSI-RS period;
number of CSI-RSs transmitted in one CSI-RS period;
indexes of the CSI-RSs transmitted in one CSI-RS period;
time unit locations of the CSI-RSs transmitted in one CSI-RS period; or
frequency domain unit locations of the CSI-RSs transmitted in one CSI-RS period.

The UE may obtain the association information from the SSB to the RO based on the foregoing configuration information, which includes one or more of the following:
association period from SSB to RO (for example, the number of PRACH configuration period required to complete at least one association from SSB to RO);
association pattern period from SSB to RO (for example, a time duration that ensure the associations from SSB to RO in the two adjacent association pattern period are exactly the same, for example, number of required association periods from SSB to RO, or number of required PRACH configuration period).

The UE may obtain association information from the CSI-RS to the RO based on the foregoing configuration information, which includes one or more of the following:
association period from CSI-RS to RO (for example, the number of PRACH configuration periods required to complete all the associations from CSI-RS to RO in at least one CSI-RS period);

association pattern period from CSI-RS to RO (for example, a time duration that ensure the associations from CSI-RS to RO in the two adjacent association pattern periods are exactly the same, for example, the number of required association periods from CSI-RS to RO, or the number of required PRACH configuration period).

The UE determines a CSI-RS index for determining a RO by configuring one or N (N>1) CSI-RS indexes for random access:

if the UE obtains a CSI-RS index for random access, then determining to use the CSI-RS index to determine to determine random access resources;

If the UE obtains N CSI-RS indexes for random access, the UE may:

randomly selecting one CSI-RS index from the N CSI-RS indexes with equal probability, and determining to use the CSI-RS index to determine to determine random access resources;

selecting a CSI-RS index with the highest reference signal received power (RSRP) from the N CSI-RS indexes, and determining to use the CSI-RS index to determine the random access resources.

The UE determines the available ROs according to the association relationship from the CSI-RS to the RO (i.e., to specify the location and number of ROs associated to a given CSI-RS according to one or more RO indexes mapped by one configured CSI-RS), that is to determine one or more ROs (PRACH occasion ROs) currently available for the selected CSI-RS; wherein the UE indexes all the ROs configured in one indexing time period according to a predefined manner (for example, a manner of frequency domain first and then the time domain in the present application, or a manner of time domain first and then frequency domain) according to the indication of the random access configuration information; the indexing of the ROs will be reset per indexing time period (i.e., indexing starting from zero again); wherein the indexing time period may be:

time duration (for example, the number of OFDM symbols, the number of slots, etc.) in which all CSI-RSs configured for the UE in one CSI-RS period are completely mapped to the corresponding ROs; which may be also referred as to an association circle from the CSI-RS to RO;

PRACH configuration period;
association period from CSI-RS to RO;
association pattern period from CSI-RS to RO;
in particular, the indexing time period could be an association period from SSB to RO;
in particular, the indexing time period could be an association pattern period from SSB to RO;
in particular, the indexing time period could be a time duration (for example, the number of OFDM symbols, the number of slots, etc.) in which all the SSBs configured in one SSB period are completely mapped to the corresponding RO; or it may also be referred as to an association circle from SSB to RO.

Figure 3:
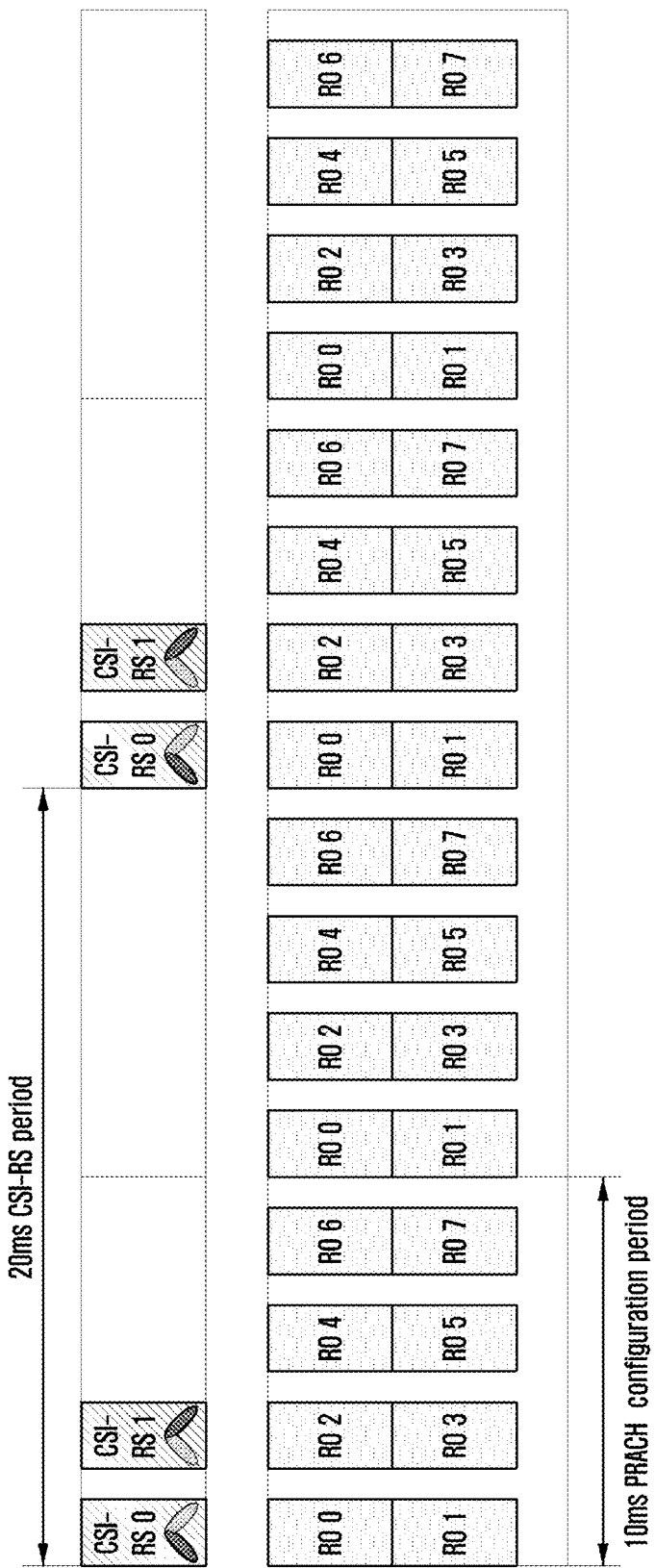
FIG. 3 illustrates a schematic diagram of indexing at least one RO in a indexing time period according to an embodiment of the present application.

As shown in FIG. 3, FIG. 3 is an exemplary indexing diagram of indexing the indexes of all ROs configured in a PRACH configuration period and resetting the sequence of the ROs indexes in different PRACH configuration periods.

Specifically, all the ROs configured in the foregoing one time period may be valid ROs determined after a certain judging rule (i.e., a predetermined selection rule), and the judging rule may be determined by the UE based on uplink and downlink configuration information configured by the network equipment and/or the SSB configuration information, for example, the UE determines:

1. the RO obtained from the random access configuration is only in one uplink and downlink configuration period, and the part indicated by the uplink and downlink configuration information as the uplink is a valid RO;

2. the RO obtained from the random access configuration is only in one uplink and downlink configuration period, and the part indicated by the uplink and downlink configuration information that is not downlink is a valid RO;

3. the RO obtained from the random access configuration is only one uplink time configuration period, and it is a valid RO after one or more time units after the part indicated as the downlink in the uplink and downlink configuration information; or 4. the RO obtained from the random access configuration is only in one uplink and downlink configuration period, and it is a valid RO after one or more time units after the last SSB indicated as the SSB configuration information in the uplink and downlink configuration information.

Figure 4:
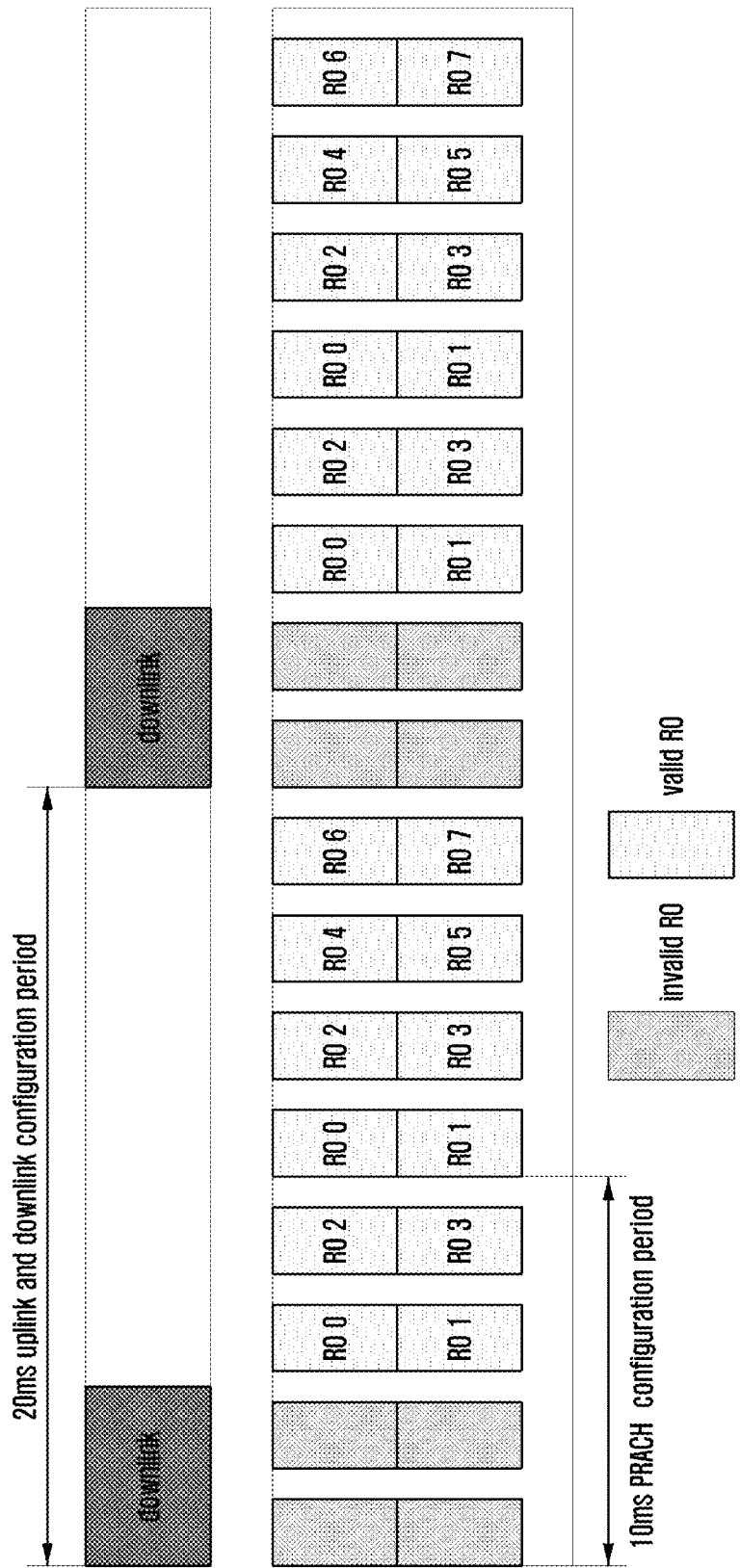
FIG. 4 illustrates still another schematic diagram of indexing at least one RO in a indexing time period according to an embodiment of the present application.

As shown in FIG. 4, FIG. 4 is an exemplary indexing diagram of indexing and indexing valid ROs in one PRACH configuration period and resetting the sequence of the RO indexes in different PRACH configuration periods.

Figure 5:
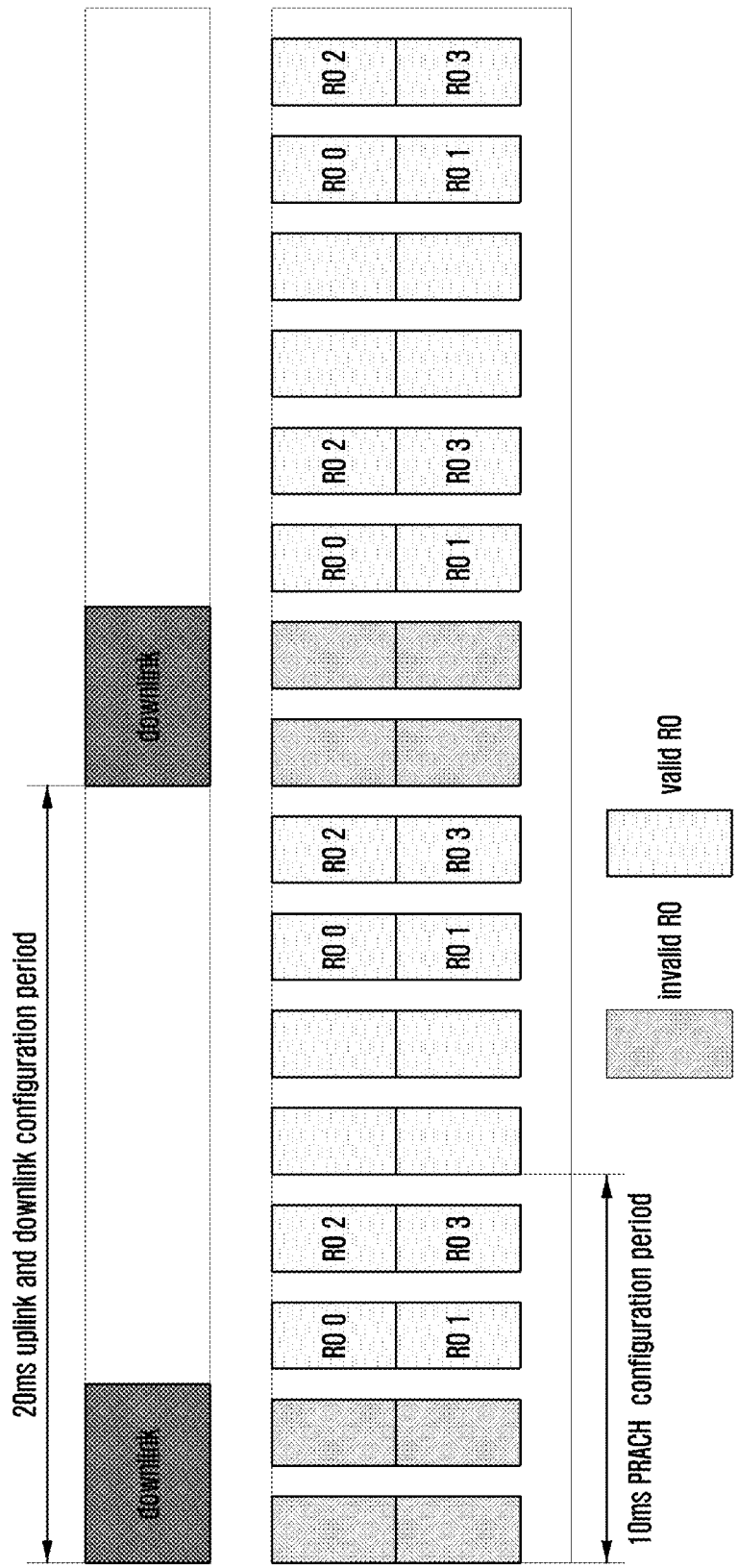
FIG. 5 illustrates another schematic diagram of indexing at least one RO in a indexing time period according to an embodiment of the present application.

In particular, the indexing may be performed according to the minimum number of valid ROs in the time period, that is, indexing with the minimum number of valid ROs in all the time periods. As shown in FIG. 5, even in the second PRACH configuration period, the first 4 ROs should be valid, but should be indexed based on the 4 ROs obtained in the first PRACH configuration period.

The UE determines the ROs available to the UE according to the configured RO index and the available RO obtained by the above association relationship, and performs random access according to the ROs:

if the UE obtains only one RO index configuration for one CSI-RS, the UE determines that the RO performs random access preamble transmission for the selected RO;

if the UE obtains a configuration of N (N>1) RO indexes for one CSI-RS, then the UE:

selects the RO with the lowest RO index value to transmit the random access preamble;

randomly selects one RO from N ROs with equal probability to transmit the random access preamble;

selects the first available RO in the N ROs to transmit the random access preamble; the first available RO refers to the first available RO after the UE is ready to transmit the random preamble.

Figure 6:
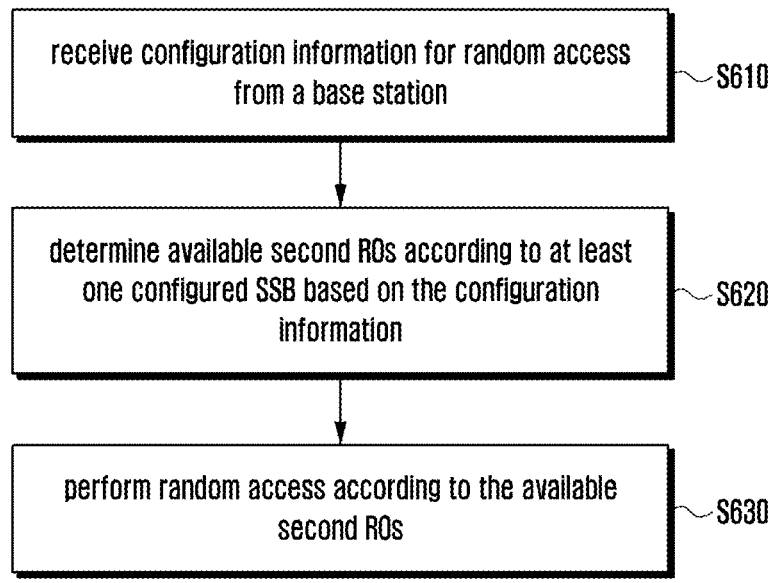
FIG. 6 illustrates a schematic flowchart of a random access method according to still another embodiment of the present application.

Another embodiment of the present application provides a random access method, as shown in FIG. 6, includes: Step S610: receiving configuration information for random access from a base station; Step S620: determining the available second ROs according to at least one configured SSB based on the configuration information; and Step S630: performing random access according to the available second ROs.

Compared with the prior art, the random access method provided by the embodiment of the present application receives the configuration information for the random access from the base station, and provides the premise guarantee for the subsequent determination of the ROs; and the available the second ROs according to the configured at least one SSB based on the configuration information are determined, so that the UE can determine the time-frequency resources for random access through the indication of the configured SSB, providing more ways of performing random access while laying the basis for subsequent random access; the random access is performed according to the available first ROs, so that random access is quickly performed according to the ROs determined by the SSB, and the UE can perform autonomous handover in the presence of long-range interference, thereby increasing the probability of successful random access.

Specifically, the configuration information includes one or more of random access configuration information for no long-range interference, random access configuration information for presence of long-range interference, or SSB configuration information.

Further, the determining available second ROs according to at least one configured SSB based on the configuration information, includes:

determining third association information between SSB and ROs according to first configuration information or second configuration information, the first configuration information includes current random access configuration information for no long-range interference and the SSB configuration information, the second configuration information includes current random access configuration information for presence of long-range interference and the SSB configuration information;

determining available second ROs according to at least one configured SSB based on the third association information.

Further, before determining available second ROs according to at least one configured SSB based on the third association information, further includes:

initiating random access preamble transmission counter, preamble power ramping counter and random access response PDCCH counter, wherein the random access preamble transmission counter is used for recording number of times of transmission of the random access preambles, the random access response PDCCH counter is used for recording number of times that the PDCCH of the random access radio network temporary identify matched with the second ROs is not searched in a random access response search window; the performing random access according to the available second ROs, includes:

if the value of the random access preamble transmission counter is greater than or equal to a configured threshold for switching random access configuration information or the value of the random access response PDCCH counter is greater than or equal to the threshold for switching random access configuration information, then performing any one of the following operations:

switching to the random access configuration information for presence of long-range interference from the current random access configuration information for no long-range interference, and performing a subsequent random access attempt in this random access according to the switched random access configuration information for presence of long-range interference;

switching to the random access configuration information for no long-range interference from the current random access configuration information for presence of long-range interference, and performing a subsequent random access attempt in this random access according to the switched random access configuration information for no long-range interference.

Further, the method further includes:

obtaining random access configuration selection indication information configured by a base station.

Further, the obtaining random access configuration selection indication information configured by a base station, through one or more of the following:

a system information-radio network temporary identity (SI-RNTI) scrambles a physical downlink control channel (PDCCH) in a system information search space of cyclic redundancy code check (CRC);

a paging-radio network temporary identity (P-RNTI) scrambles a PDCCH in a paging search space of the CRC;

random access-radio network temporary identity (RA-RNTI) scrambles a PDCCH in a random access search space of the CRC;

temporary cell-radio network temporary identify (TC-RNTI) or the C-RNTI scrambles a PDCCH in a search space of the CRC;

radio network-temporary identify specific to random access configuration information (RACI-RNTI) scrambles a PDCCH in a search space of the CRC;

radio network temporary identity common to other user groups scrambles a PDCCH in a search space of the CRC;

system information; and

RRC signaling.

Further, the performing random access according to the available second ROs, including:

performing random access according to the available second ROs, in a transmission time period in which the random access configuration selection indication information is received, based on the random access configuration information indicated by the random access configuration selection indication information; or performing random access according to the available second ROs in a next transmission time period of the transmission time period in which the random access configuration selection indication information is received, based on the random access configuration information indicated by the random access configuration selection indication information; the transmission time period includes any one of the following:

an SSB period; a PRACH configuration period; a paging period; a configured modification period; and an association time period from SSB to RO.

The following describes the random access method of the foregoing embodiment of the present application in a comprehensive and detailed manner:

specifically, in this embodiment, in some communication systems that consider RIM, the UE may autonomously select a new random access resource configuration by the method provided in this embodiment or select a new random access configuration based on the indication of the base station equipment; thereby achieving the purpose of improving the success rate of random access.

Specifically, the UE obtains configuration information of the network from the network side through system information or RRC configuration message or the downlink control channel, and includes one or more of the following:

random access configuration information for no-range distance interference; including one or more of the following:

PRACH configuration period;

time unit index of RO (such as slot index, symbol index, subframe index, etc.);

frequency domain unit index of RO (such as carrier index, BWP index, PRB index, subcarrier index, etc.);

number of ROs;

random access preamble format (such as CP length, preamble sequence length and repetition number, GT length, used subcarrier size, etc.);

number of random access preambles, the index of the root sequence, and the cyclic shift value;

number of SSBs that can be mapped on one RO.

random access configuration information for presence of long distance interference;

including one or more the following:

PRACH configuration period;

time unit index of RO (such as slot index, symbol index, subframe index, etc.);

frequency domain unit index of RO (such as carrier index, BWP index, PRB index, subcarrier index, etc.);

number of ROs;

random access preamble format (such as CP length, preamble sequence length and repetition number, GT length, used subcarrier size, etc.);

number of random access preambles, the index of the root sequence, and the cyclic shift value;

number of SSBs that can be mapped on one RO;

threshold for switching random access configuration information.

SSB configuration information; including one or more of the following:

size of SSB period;

number of SSBs transmitted in one SSB period;

time unit locations of the SSBs transmitted in one SSB period;

frequency domain unit location of the SSBs transmitted in one SSB period.

The UE may obtain association information (different association information from SSB to RO may be obtained based on different random access configuration information) from SSB to RO based on the above random access configuration information (for random access configuration information for no long-range interference or random access configuration information for presence of long-range interference) and SSB configuration information, including one or more the following:

association period from SSB to RO (for example, the number of PRACH configuration period required to complete at least one association from SSB to RO);

association pattern period from SSB to RO (for example, a time duration that ensure the associations from SSB to RO in the two adjacent association pattern period are exactly the same, for example, number of required association periods from SSB to RO, or number of required PRACH configuration period).

The UE first sets a random access preamble transmission counter to 0, a preamble power ramping counter to 0, and a random access response PDCCH counter (RAR_PDCCH_counter) to 0 based on current default (or pre-selected) random access configuration information (e.g., random access configuration information for no long-range interference, and for example, random access configuration information for presence of long-range interference) and the association information from SSB to RO. Then determining the available RO according to the selected SSB and the determined association information, and transmitting a random access preamble on the determined available RO, that is, determining the available RO according to the configured SSB based on the determined association information from the SSB to RO, and transmitting the random access preamble on the determined available RO, and then using a random access-radio network temporary identifier (RA-RNTI) associated to the determined RO, searching for possible PDCCH on the configured downlink resources and in the random access response window (RAR window), wherein the RAR_PDCCH_counter is for recording the number of times that the UE does not search for the PDCCH matching to the RA-RNTI in the entire RAR window. The present application proposes two ways, so that the UE may autonomously switch from random access based on default (or pre-selected) random access configuration information to random access based on another random access configuration information, for example, switching from a random access configuration information based on no long-range interference to the random access configuration information for the presence of long-range interference. Specifically:

1. The UE does not search for the PDCCH in the entire RAR window, or searches for the PDCCH and decodes the RAR carried by the corresponding PDSCH, but the RAR does not have a random access preamble index (RAPID) transmitted by the corresponding UE; the UE will transmit the new random access preamble; if the UE's random access preamble transmission counter exceeds (not less than) the threshold for switching random access configuration information, the UE autonomously switches the random access configuration information for no long-range interference to the random access configuration information for presence of long-range interference; and uses the random access configuration information for presence of long-range interference to perform subsequent random access in the random access attempt.

2. The UE does not search for the PDCCH in the entire RAR window, and the RAR_PDCCH_counter is incremented by one. If the UE searches for the PDCCH matching the RA-RNTI in the RAR window, the RAR_PDCCH_counter remains unchanged, even if the RAR carried in the scheduled PDSCH does not have a matching RAPID. When the RAR_PDCCH_counter exceeds (or not less than) the threshold for switching random access configuration information, the UE autonomously switches to the random connection for the presence of long-range interference from the random access configuration information for no long-range interference; and uses the random access configuration information for presence of long-range interference to perform the subsequent random access attempt in this random access procedure.

Furthermore, in addition to the UE autonomously selecting a new random access resource configuration, the present application further provides a manner in which the UE receives the indication of the base station equipment to select new random access configuration resources. The UE obtains N pieces of random access configuration information from the network side, and the network side notifies the user of the specifically-used random access configuration information by the random access configuration selection indication. For example, the UE obtains N=2 pieces of random access configuration information from the network side (for example, one piece of random access configuration information for no long-range interference, and one piece of random access configuration information for presence of long-range interference), the network equipment notifies the UE which random access configuration to use by M=$\lceil \log_2 N \rceil$ ($\lceil x \rceil$ represents the minimum integer greater than x) bits, for example, N=2, then M=1. The UE may obtain the random access configuration selection indication information by using one or more of the following:

1. using the SI-RNTI (system information-RNTI) to scramble the downlink control channel in the system information search space of the cyclic redundancy check (CRC);

2. using P-RNTI (paging-RNTI) to scramble the downlink control channel in the paging search space of the CRC;

3. using RA-RNTI (random access-RNTI) to scramble the downlink control channel in the random access search space of the CRC;

4. using TC-RNTI or C-RNTI to scramble the downlink control channel in the search space of the CRC;

5. random access configuration indication-RNTI (RACI-RNTI) dedicated to the random access configuration selection indication scrambles the downlink control channel in the search space of the CRC;

6. the radio network temporary identifier common to other user groups (for example, SFI-RNTI (slot format indication—RNTI) indicated by the slot format, interruption-RNTI (INT-RNTI), transmit power control-physical uplink shared channel-RNTI (TPC-PUSCH-RNTI), transmit power control-sounding reference signal-RNTI (TPC-SRS-RNTI));

7. system information; and

8. RRC signaling.

Specifically, if N=2, the random access configuration selection indication information (or the RI has indication information) may also be indicated by "true" or "false", for example, if the indication is "true", the random access configuration information for presence of long-range interference is used, and if the indication is "false", the random access configuration information for no long-range interference is used.

After obtaining the random access configuration selection indication information, the UE may:

1. prepare a possible random access transmission by using the indicated random access configuration immediately after receiving all the time units of the random access configuration selection indication information; or 2. after receiving the random access configuration selection indication information in a time period, prepare the possible random access transmission by using the indicated random access configuration at the beginning of the next time period; before the beginning of the next time period, preparing a possible random access transmission with the previous random access configuration; the time period may be one or more of the following:

a) SSB period;
b) PRACH configuration period;
c) paging period;
d) configured modification period;
e) association period of the SSB-RO; and
f) association pattern period of the SSB-RO.

Figure 7:
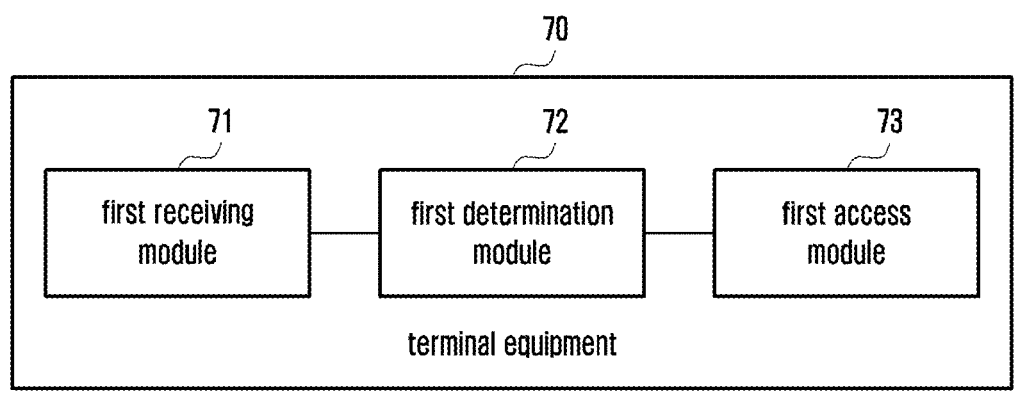
FIG. 7 illustrates a schematic diagram of a basic structure of a terminal equipment according to an embodiment of the present application.

FIG. 7 is a schematic structural diagram of a terminal equipment according to an embodiment of the present disclosure. As shown in FIG. 7, the terminal equipment 70 may include a first receiving module 71, a first determination module 72, and a first access module 73, wherein:

the first receiving module 71 is configured to receive configuration information for random access from a base station;

the first determination module 72 is configured to determine available first ROs, according to at least one configured channel state information reference signal (CSI-RS), based on the configuration information;

the first access module 73 is configured to perform random access according to the available first ROs.

Specifically, the configuration information includes one or more of random access configuration information, SSB configuration information, or CSI-RS configuration information.

The random access configuration information includes one or more of the following:

PRACH configuration period; frequency-domain unit index of RO; time-frequency unit index of RO; number of ROs; format of random access preamble; number of random access preambles; root sequence index of random access preambles; cyclic shift value of random access preamble; number of SSBs that can be mapped on one RO; index of at least one CSI-RS for random access; number of ROs mapped by one CSI-RS; and index of at least one RO mapped by one CSI-RS.

The SSB configuration information includes one or more of the following:

size of SSB period; number of SSBs transmitted in one SSB period; indexes of SSBs transmitted in one SSB period; time unit locations of SSBs transmitted in one SSB period; frequency-domain unit locations of SSBs transmitted in one SSB period;

CSI-RS configuration information includes one or more of the following:

size of CSI-RS period; number of CSI-RSs transmitted in one CSI-RS period; indexes of CSI-RSs transmitted in one CSI-RS period; time unit locations of CSI-RSs transmitted in one CSI-RS period; frequency-domain unit locations of CSI-RSs transmitted in one CSI-RS period.

Further, the first determination module is specifically configured to determine a indexing time period of the RO based on the configuration information, and determining the available first RO according to the at least one configured CSI-RS based on the indexing time period.

Further, the first determination module is specifically configured to determine a target CSI-RS for determining a RO according to the at least one configured CSI-RS; and determine the available first RO associated to the target CSI-RS based on the indexing time period and an index of at least one RO mapped by the target CSI-RS.

Further, the first determination module is specifically configured to: if there is one configured CSI-RS, the configured CSI-RS is determined as the target CSI-RS; if there are multiple configured CSI-RSs, any CSI-RS selected randomly from the multiple CSI-RSs with a medium probability is determined as the target CSI-RS; and the CSI-RS having the highest reference signal received power among the multiple CSI-RSs is determined as the target CSI-RS.

Further, the first determination module is specifically configured to index at least one RO in each indexing time period according to a predetermined manner respectively, to obtain a time-frequency resource location associated to each RO, wherein the RO represents an initial index reset of the RO in each indexing time period by an index; and determine the time-frequency resource location of the available first RO associated to the target CSI-RS based on a predefined association relationship between the CSI-RS and/or the RO and an index of at least one RO mapped by the target CSI-RS.

Further, the first determination module is specifically configured to determine first association information from SSB to RO and second association information from CSI-RS to RO, the first association information comprises an association period from SSB to the RO and/or an association pattern period from SSB to RO, the second association information comprises an association period from CSI-RS to ROs and/or an association pattern period from the CSI-RS to RO; obtain a PRACH configuration period from the configuration information; compute a time duration in which each CSI-RS configured in one CSI-RS period is completely mapped to a corresponding RO, according to the configuration information; and compute a time duration in which each SSB configured in one SSB period is completely mapped to a corresponding ROs, according to the configuration information.

Further, the indexing time period includes any one of the following:

an association period from CSI-RS to RO;
an association pattern period from CSI-RS to RO;

an association period from SSB to RO;

an association pattern period from SSB to RO;

PRACH configuration period;

a time duration in which each CSI-RS configured in one CSI-RS period is completely mapped to a corresponding RO; and a time duration in which each SSB configured in one SSB period is completely mapped to a corresponding RO.

Further, the first determination module is specifically configured to index indexes of all the ROs in each indexing time period according to the predetermined manner; or for any indexing time period, select valid ROs from ROs in the indexing time period based on a predetermined selection rule, and index indexes of the valid ROs according to the predetermined manner; or for any indexing time period, select valid ROs from ROs in the indexing time period based on a predetermined selection rule, and select ROs to be indexed from the valid ROs, and index indexes of the ROs to be indexed according to the predetermined manner.

Further, the first determination module is specifically configured to select ROs to be indexed from the valid ROs according to the minimum number of valid ROs in each indexing time period and the time-frequency resource locations of the minimum number of valid ROs in the corresponding indexing time period.

Further, the first access module is specifically configured to perform random access according to the first ROs if there is one time-frequency resource location of available first ROs; or if there are multiple time-frequency resource locations of available first ROs, one or more of the following operations is performed:

determining an index with the lowest index value in the available first ROs associated to multiple time-frequency resources locations, and performing random access according to the ROs with the lowest index value; randomly selecting any first ROs from the valid first ROs associated to multiple time-frequency resource locations with a medium probability, and performing random access according to any first Ros; determining the first available first ROs in the available first ROs associated to multiple time-frequency resource locations, and performing random access according to the first available first ROs, wherein the first available first ROs is the first available first ROs after a UE completes a preparation of transmission of random access preambles.

Compared with the prior art, the equipment provided by the embodiment of the present application receives the configuration information for the random access from the base station, and provides the premise guarantee for the subsequent random access;

and determine the available first ROs according to the at least one configured CSI-RS based on the configuration information, so that the UE can determine the time-frequency resources for random access through the indication of the configured CSI-RS, providing more ways of performing random access while laying the basis for subsequent random access;

the random access is performed according to the available first ROs, so that random access is quickly performed according to the ROs determined by the CSI-RS.

Figure 8:
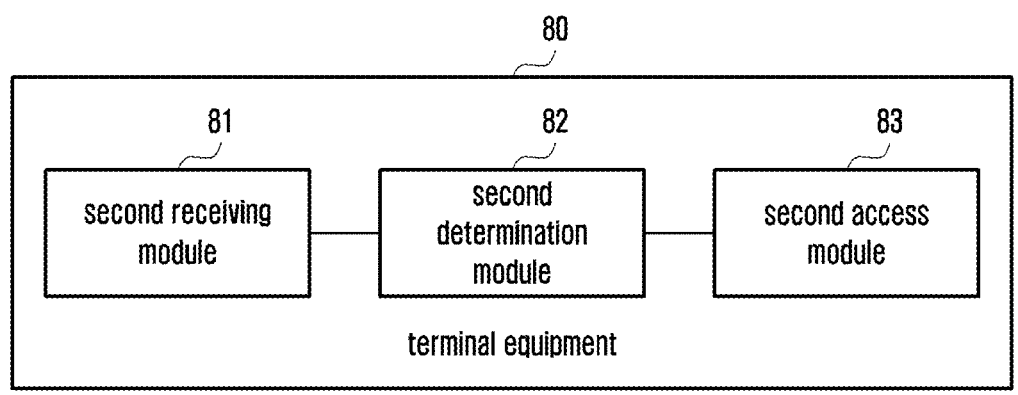
FIG. 8 illustrates a schematic diagram of a basic structure of a terminal equipment according to still another embodiment of the present application.

FIG. 8 illustrates a schematic structural diagram of a terminal equipment according to an embodiment of the present application. As shown in FIG. 8, the terminal equipment 80 may include a second receiving module 81, a second determination module 82, and a second access module 83, wherein:

the second receiving module 81 is configured to receive configuration information for random access from a base station;

the second determination module 82 is configured to determine available second ROs, according to at least one configured SSB, based on the configured information; and the second access module 83 is configured to perform random access according to the available second ROs.

Specifically, the configuration information includes one or more of random access configuration information for no long-range interference, random access configuration information for presence of long-range interference, or SSB configuration information.

Further, the second determination module 82 is specifically configured to determine third association information between SSB and RO according to first configuration information or second configuration information, the first configuration information comprises current random access configuration information for no long-range interference and the SSB configuration information, the second configuration information comprises current random access configuration information for presence of long-range interference and the SSB configuration information; and determine available second ROs according to at least one configured SSB based on the third association information.

Further, an initialization module (not shown) is further included, the initialization module is specifically configured to initialize random access preamble transmission counter, preamble power ramping counter and random access response PDCCH counter, wherein the random access preamble transmission counter is used for recording number of times of transmission of the random access preambles, the random access response PDCCH counter is used for recording number of times that the PDCCH of the random access radio network temporary identify matched with the second RO is not searched in a random access response search window.

Wherein, the second access module 83 is specifically configured to: if the value of the random access preamble transmission counter is greater than or equal to a configured threshold for switching random access configuration information or the value of the random access response PDCCH counter is greater than or equal to the threshold for switching random access configuration information, then performing any one of the following operations:

switching to the random access configuration information for presence of long-range interference from the current random access configuration information for no long-range interference, and performing a subsequent random access attempt in this random access according to the switched random access configuration information for presence of long-range interference;

switching to the random access configuration information for no long-range interference from the current random access configuration information for presence of long-range interference, and performing a subsequent random access attempt in this random access according to the switched random access configuration information for no long-range interference.

Further, the equipment further includes an obtaining module (not shown) for obtaining random access configuration selection indication information configured by the base station.

Further, the obtaining module is specifically configured to obtain random access configuration selection indication information configured by the base station by using one or more of the following:

system information-radio network temporary identity (SI-RNTI) scrambling a physical downlink control channel (PDCCH) in a system information search space of cyclic redundancy code check (CRC);

paging-radio network temporary identity (P-RNTI) scrambling a PDCCH in a paging search space of the CRC;

random access-radio network temporary identity (RA-RNTI) scrambling a PDCCH in a random access search space of the CRC;

temporary cell-radio network temporary identify (TC-RNTI) or the C-RNTI scrambling a PDCCH in a search space of the CRC;

radio network-temporary identify specific to random access configuration information (RACI-RNTI) scrambling a PDCCH in a search space of the CRC;

radio network temporary identity common to other user groups scrambling a PDCCH in a search space of the CRC;

system information; and

RRC signaling.

Further, the second access module 83 is specifically configured to perform random access according to the available second ROs, in a transmission time period in which the random access configuration selection indication information is received, based on the random access configuration information indicated by the random access configuration selection indication information; or, perform random access according to the available second ROs in a next transmission time period of the transmission time period in which the random access configuration selection indication information is received, based on the random access configuration information indicated by the random access configuration selection indication information;

the transmission time period includes any one of the following:

SSB period; PRACH configuration period; paging period; a configured modification period; an association time period from SSB to RO.

Compared with the prior art, the device provided by the embodiment of the present application receives the configuration information for the random access from the base station, and provides the premise guarantee for the subsequent determination of the ROs; and determines the available the second ROs according to the configured at least one SSB based on the configuration information so that the UE can determine the the time-frequency resources for random access through the indication of the configured SSB, providing more ways of performing random access while laying the basis for subsequent random access. The random access is performed according to the available first ROs, so that random access is quickly performed according to the ROs determined by the SSB, and the UE can perform autonomous handover in the presence of long-range interference, thereby increasing the probability of successful random access.

Another embodiment of the present invention provides a terminal equipment comprising: a processor; and a memory configured to store machine readable instructions that, when executed by the processor, cause the processor to perform the above random access method.

Figure 9:
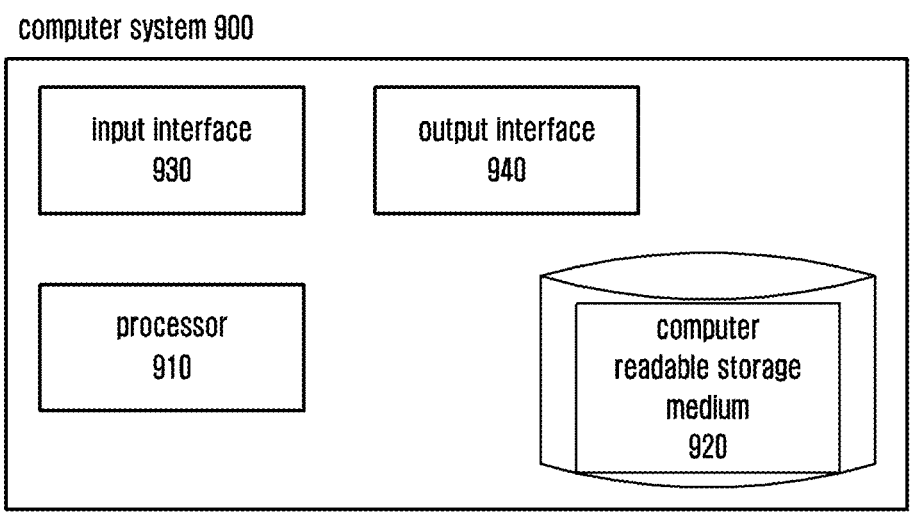
FIG. 9 illustrates a block diagram of a computing system that can be used to implement a user equipment disclosed in an embodiment of the present invention.

FIG. 9 illustrates a block diagram that schematically illustrates a computing system according to an embodiment of the present disclosure that can be used to implement the UE of the present disclosure.

As shown in FIG. 9, a computing system 900 includes a processor 910, a computer readable storage medium 920, an output interface 930, and an input interface 940. The computing system 900 may perform the method described above with reference to FIG. 2 or FIG. 6 to configure a reference signal and perform data transmission based on the reference signal.

In particular, the processor 910 may include, for example, a general purpose microprocessor, an instruction set processor, and/or a related chipset and/or a special purpose microprocessor (e.g., an application specific integrated circuit (ASIC)), and the like. The processor 910 may also include an onboard memory for caching purposes. The processor 910 may be a single processing unit or a plurality of processing units for performing different actions of the method flow described with reference to FIG. 2 or FIG. 6.

The computer readable storage medium 920, for example, may be any medium that can contain, store, communicate, propagate or transport the instructions. For example, a readable storage medium may include, but is not limited to, an electronic, magnetic, optical, electromagnetic, infrared, or semiconductor system, apparatus, device, or propagation medium. Specific examples of the readable storage medium include: a magnetic storage apparatus such as a magnetic tape or a hard disk (HDD); an optical storage apparatus such as a compact disk (CD-ROM); a memory such as a random access memory (RAM) or a flash memory; and/or a wired/wireless communication link.

The computer readable storage medium 920 may include a computer program, which may include codes/computer executable instructions that, when executed by the processor 910, cause the processor 910 to perform, for example, the method flow described above in combination with FIG. 2 or FIG. 6 and any variations thereof.

The computer program may be configured to have, for example, computer program codes including a computer program module. For example, in an example embodiment, the codes in the computer program may include one or more program modules, including, for example, module 1, module 2, . . . . It should be noted that the division manner and number of modules are not fixed, and those skilled in the art may use suitable program modules or program module combinations according to actual cases. When these program module combinations are executed by the processor 910, the processor 910 may perform, for example, the method flow described above in connection with FIG. 2 or FIG. 6 and any variations thereof.

According to an embodiment of the present disclosure, the processor 910 may use the output interface 930 and the input interface 940 to perform the method flow described above in connection with FIG. 2 or FIG. 6 and any variations thereof.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times, and the execution order thereof is also not necessarily performed sequentially, but may be performed alternately or alternately with at least a portion of other steps or sub-steps or stages of other steps.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
receiving, from a base station, configuration information for random access, wherein the configuration information includes at least one channel state information-reference signal (CSI-RS) indexes and at least one physical random access channel occasions (ROs) corresponding to each of the at least one CSI-RS indexes;
determining ROs associated with the at least one CSI-RS based on the configuration information; and
performing a random access according to the ROs,
wherein an indexing of ROs is reset per an association pattern period, and
wherein the association pattern period includes one or more association periods and is associated with a pattern based on a synchronization signal block (SSB) and the ROs.

2. The method according to claim 1, wherein the indexing of the ROs is sequentially numbered.

3. A method performed by a base station in a wireless communication system, the method comprising:
transmitting, to a user equipment (UE), configuration information for random access, wherein the configuration information includes at least one channel state information-reference signal (CSI-RS) indexes and at least one physical random access channel occasions (ROs) corresponding to each of the at least one CSI-RS indexes,
wherein ROs associated with the at least one CSI-RS is determined based on the configuration information,
wherein a random access is performed according to the ROs,
wherein an indexing of ROs is reset per an association pattern period, and
wherein the association pattern period includes one or more association periods and is associated with a pattern based on a synchronization signal block (SSB) and the ROs.

4. The method according to claim 3, wherein the indexing of the ROs is sequentially numbered.

5. A user equipment (UE) comprising:
a transceiver to transmit and receive at least one signal; and
at least one processor coupled to the transceiver, and configured to:
receive, from a base station, configuration information for random access, wherein the configuration information includes at least one channel state information-reference signal (CSI-RS) indexes and at least one physical random access channel occasions (ROs) corresponding to each of the at least one CSI-RS indexes,
determine ROs associated with the at least one CSI-RS based on the configuration information, and
perform a random access according to the ROs,
wherein an indexing of ROs is reset per an association pattern period, and
wherein the association pattern period includes one or more association periods and is associated with a pattern based on a synchronization signal block (SSB) and the ROs.

6. The UE according to claim 5, wherein the indexing of the ROs is sequentially numbered.

7. A base station comprising:
a transceiver to transmit and receive at least one signal; and
at least one processor coupled to the transceiver, and configured to:
transmit, to a user equipment (UE), configuration information for random access, wherein the configuration information includes at least one channel state information-reference signal (CSI-RS) indexes and at least one physical random access channel occasions (ROs) corresponding to each of the at least one CSI-RS indexes,
wherein ROs associated with the at least one CSI-RS is determined based on the configuration information,
wherein a random access is performed according to the ROs,
wherein an indexing of ROs is reset per an association pattern period, and
wherein the association pattern period includes one or more association periods and is associated with a pattern based on a synchronization signal block (SSB) and the ROs.

8. The base station according to claim 7, wherein the indexing of the ROs is sequentially numbered.

* * * * *